UNITED STATES PATENT OFFICE.

GEORGE WOFFENDEN, OF NEWTOWN, CONNECTICUT, ASSIGNOR TO NEW YORK BELTING AND PACKING COMPANY.

IMPROVEMENT IN INDIA-RUBBER ARTICLES.

Specification forming part of Letters Patent No. 213,601, dated March 25, 1879; application filed February 25, 1879.

*To all whom it may concern:*

Be it known that I, GEORGE WOFFENDEN, of Newtown, in the county of Fairfield and State of Connecticut, have invented a new and useful Improvement in the Manufacture of India-Rubber Articles, which improvement is fully set forth in the following specification.

Heretofore, in manufacturing sheets of soft vulcanized rubber corrugated or otherwise formed in elevations and depressions on their surface, for use as door-mats and for other purposes, the methods pursued have been ordinarily to employ a metallic plate with elevations and depressions in reverse on its face, or to use calender-rolls having in intaglio on their surface the design to be produced in relief on the sheet; or the parts in relief were applied to the sheets while in their plastic condition.

Other analogous means have been used to produce similar effects. These methods are very expensive and slow, on account of the great labor and time necessarily bestowed in carrying them out.

This invention consists in vulcanizing the sheets of soft rubber in contact with plates of hard rubber or vulcanite, upon the surface of which is formed the design or pattern to be produced.

The following description will enable those skilled in the art to make and use my invention.

The design to be produced on the surface of the soft-rubber sheets having been executed in any suitable material, the plates of hard rubber or vulcanite are made by vulcanizing the prepared rubber composition in contact therewith. In this way a sufficient number of pattern-plates may be readily produced at a comparatively small expense, the design or pattern being in reverse—that is, the parts to be in relief on the soft-rubber sheets being in intaglio, and vice versa.

A hard-rubber or vulcanite plate having thus been formed with the depressions and elevations of the design in reverse, the sheet of rubber composition, prepared with sulphur, with or without other materials, in the manner well understood to those skilled in the art, is pressed into contact with the plate of vulcanite, so as to fill all the depressions or interstices. Screw-pressure may be employed for the purpose.

The sheet and the vulcanite plate are then placed in the vulcanizing apparatus, and the proper temperature is produced in the ordinary way for making soft-rubber articles. The hard-rubber or vulcanite plate, having been formed by subjecting the materials from which it is prepared to a much higher temperature than is required for vulcanizing soft rubber, maintains its form and serves perfectly as the mold for the soft-rubber sheet.

After the vulcanizing operation is complete, the plate and the soft-rubber sheet are removed and separated, the plate being used again indefinitely, as there is no perceptible deterioration.

To form the vulcanite plates, prepared metallic plates may be used, if desired; or the mold or matrix by which the casting of the hard-rubber plates is effected may be of any suitable material; or the plates may be prepared by calenders, or in any way known to the art.

It will be readily understood that the manner of preparing the rubber composition for the hard or for the soft rubber may be varied, as desired, and also that any known or suitable method of vulcanizing the soft-rubber sheets—for example, by subjecting the soft-rubber sheet and vulcanite plates to the action of a press provided with a steam-chamber or other means for heating—may be employed, as neither the preparation of rubber composition nor vulcanization, *per se*, forms part of this invention.

It is obvious that the invention may be used for the production in soft rubber of all kinds of designs or patterns in relief for ornament or use.

Having thus described my invention, and the manner in which the same is or may be carried into effect, what I claim, and desire to secure by Letters Patent, is—

1. The method of forming sheets of vulcanized rubber corrugated or otherwise formed in elevations and depressions on their surface, the same consisting in vulcanizing sheets of the prepared rubber composition in contact with plates of hard rubber or vulcanite, upon which the design or pattern to be produced is formed, substantially as described.

2. The method of producing designs or patterns on the surface of vulcanized-rubber sheets by taking impressions of said design or pattern upon hard rubber and vulcanizing the soft-rubber sheet in pressure contact therewith, substantially as set forth.

In testimony whereof I have signed this specification in the presence of two subscribing witnesses.

GEORGE WOFFENDEN.

Witnesses:
    D. C. GATELY,
    W. W. PERKINS.